3,430,139
CIRCUIT ARRANGEMENT FOR THE MEASUREMENT OF THE ABSOLUTE DELAY OF A QUADRUPOLE ESPECIALLY OF A TRANSMISSION LINE
Klaus Schlüter, Munich, Germany, assignor to Siemens Aktiengesellschaft, Munich, Germany
Filed June 9, 1964, Ser. No. 373,725
U.S. Cl. 324—58.5
Int. Cl. G01r 27/04
3 Claims In communication technology it is often of interest, besides knowing the delay distortions, to also know the absolute delay of a quadruple, for example, of a transmission line. In transmission lines utilizing error repeat signals there results, for example, from the magnitude of the absolute delay to which the signal to be transmitted is subjected, an indication as to what proportion of the signal must be repeated in the event of a transmission disturbance.

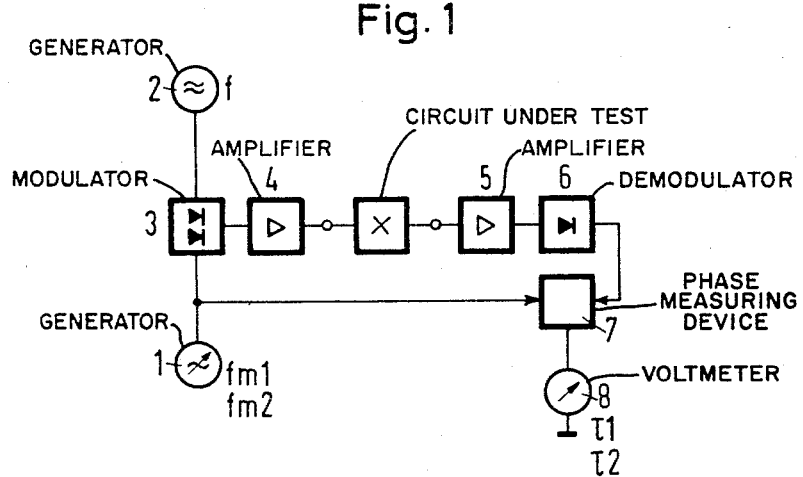
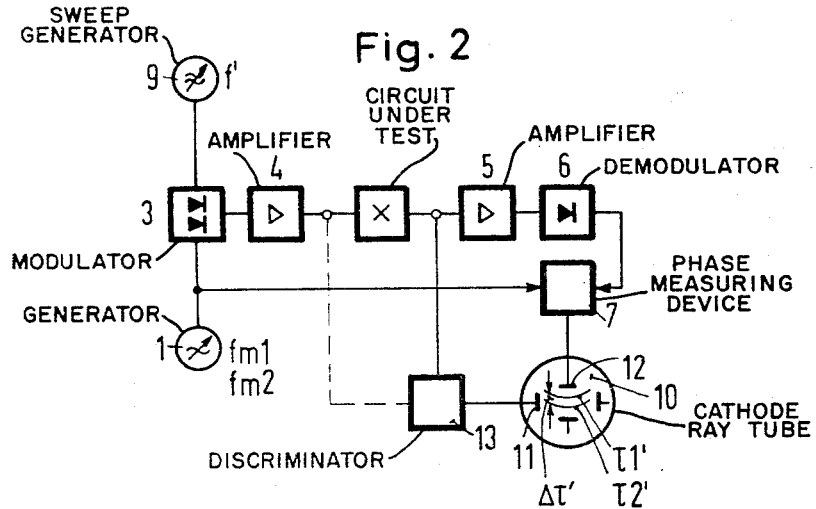

Known arrangements for the measurement of the absolute delay of a quadrupole utilize a suitably tunable sine generator of desired frequency range, whose output voltage, for example, after modulation onto a carrier oscillation is applied to the quadrupole input, while in such case demodulated quadrupole output voltage, together with the generator output voltage is subjected to a phase comparison. From the frequency change that is necessary to displace the two voltages by 360° in phase with respect to each other it is then possible to compute the absolute delay of the quadrupole. In these arrangements, however, the necessity of an exact measurement of the frequency change is a disadvantage, as is the requirement that the phase comparison indicator devices must be provided, for example, with individual cathode ray oscillographs to whose horizontal deflection system one of the two voltages to be compared is fed and to whose vertical deflection system the other of such voltages is fed.

The present invention relates to a new and advantageous circuit arrangement for the measurement of the absolute delay of a quadrupole, consisting of a first adjustable signal generator which generates a first, fixed signal frequency ($f$), a second signal generator which alternatively generates a considerably lower second signal frequency ($f_{m1}$) or a third signal frequency ($f_{m2}$) differing slightly therefrom, a modulator to whose input said signal generators are connected, the circuit to be measured being connected to the output of the modulator, with the output of such circuit being connected with the input of a succeeding demodulator, a phase measuring device whose inputs are connected to the demodulator output and the second signal generator, and which produces an output voltage whose amplitude is proportional to the phase difference of the voltages at both inputs, and a visual indicating device, such as a voltmeter which indicates the amplitude of such output voltage, such device being calibrated for the second signal frequency ($f_{m1}$) or for the third signal frequency ($f_{m2}$), and from which can be read the difference $\Delta\tau = \tau_1 - \tau_2$ of the indicated value $\tau_1$ for the second signal frequency ($f_{m1}$) and of the indicated value $\tau_2$ for the third signal frequency ($f_{m2}$), whereby the expression $$\Delta\tau = \frac{f_{m1}}{f_{m2} - f_{m1}}$$

is proportional to the absolute delay.

Another constructional example of the invention utilizes a circuit arrangement for the measurement of the absolute delay of a quadrupole consisting of a first signal generator which is constructed as a sweep generator and which generates a first wobbled signal frequency ($f'$), a second signal generator which alternatively generates a considerably lower second signal frequency ($f_{m1}$) or a third signal frequency ($f_{m2}$) differing slightly therefrom, a modulator, to whose inputs there are connected the respective signal generators, the circuit to be measured being connected with the output of the modulator, with the output of such circuit being connected with the input of a succeeding demodulator, a phase measuring device, whose inputs are connected to the output of the demodulator and to the second signal generator, and which produces an output voltage whose amplitude is proportional to the phase difference of the voltages at both inputs. The indicating device comprises a cathode ray tube, whose horizontal deflection system is connected with the output of said phase measuring device and whose picture screen is calibrated, in vertical direction, in values of the group delay for the second signal frequency ($f_{m1}$) or for the third signal frequency ($f_{m2}$), and on which are readable the mutual vertical displacement $\Delta\tau$ of the two group delay characteristic curves $\tau_1$ for the second signal frequency ($f_{m1}$) and $\tau_2$ for the third signal frequency ($f_{m2}$), with the expression $$\Delta\tau \cdot \frac{f_{m1}}{f_{m2} - f_{m1}}$$

being proportional to the absolute delay.

The invention is explained in detail with the aid of the preferred embodiments illustrated in the drawing, wherein:

FIG. 1 illustrates a measuring circuit constructed according to the invention, which serves for the measurement of the group delay of a quadrupole for a certain, adjustable measuring frequency; and FIG. 2 illustrates a measuring circuit designed according to the invention, in which the group delay characteristic of a quadrupole is depicted, within a certain measuring frequency range on the picture screen of a cathode ray tube.

Referring to FIG. 1, a first signal generator 2 generates a signal voltage whose frequency, hereinafter designated as first signal frequency, has a fixed value $f$ which is adjustable. A second signal generator 1 generates simultaneously a low frequency signal voltage, whose signal frequency alternatively is adjustable to a considerably lower value $f_{m1}$, in comparison to $f$, or to a value $f_{m2}$ deviating only slightly therefrom. The signal voltages of the signal generators 1 and 2 are conducted to a modulator 3 and therein modulated in which process there is created, dependent upon the adjustment of the second signal generator 1 at the output of modulator 3, a frequency mixture which contains either the frequencies $f$, $f + f_{m1}$, $f - f_{m1}$ or the frequencies $f$, $f + f_{m2}$, $f - f_{m2}$. The output voltage of the modulator 3 may be amplified in an amplifier 4 and fed to the quadrupole X, which represents the circuit to be measured, with respect to the absolute delay. The output voltage of the quadrupole X may be subsequently amplified in an amplifier 5 and fed to a demodulator 6, at whose output, upon completion of demodulation, there appears a voltage of the frequency $f_{m1}$ or $f_{m2}$ which is dependent in its phase on the delay properties of the quadrupole X. This latter output voltage is fed to the input of a phase measuring device 7, to whose other input there is fed the signal voltage of the second signal generator 1.

The phase measuring device 7 accomplishes, in a known manner a phase comparison of two input voltages in such a way that an output voltage is formed which is proportional to the phase difference of the two input voltages. This output voltage is fed to a voltmeter 8, which indicates the amplitude of the output voltage. The voltmeter 8 is so calibrated that there can be read from the scale the value of the group delay which is allocated to a certain first signal frequency $f$ and to a certain second signal frequency $f_{m1}$. It is also possible to so calibrate the scale of the voltmeter 8 that the group delay can be read off, which is allocated to the values $f$ and $f_{m2}$. By varying the first signal frequency $f$ of the signal generator 2, within the frequency range of interest for the quadrupole X, the group delay for each desired measuring frequency $f$ can be determined pointwise, in which process, however, the calibration of the scale of voltmeter 8 is correct in each case only for the second or third signal frequency, $f_{m1}$ or $f_{m2}$, respectively.

For the measurement of the absolute delay of the quadrupole X, the first signal frequency $f$ of the signal generator 2 is adjusted to a fixed value which preferably lies in a frequency range in which small group delay distortions occur. For this value of $f$, a measurement is first carried out of the group delay utilizing the second signal frequency $f_{m1}$, which results in an indicated value $\tau_1$ read off on the scale of the voltmeter 8. Thereafter, a second measurement is made of the group delay, utilizing the third signal frequency $f_{m2}$ instead of the second signal frequency $f_{m1}$. This latter measurement results in another indicated value $\tau_2$. The difference $\Delta \tau = \tau_1 - \tau_2$ is now evaluated according to the formula $$t_a = \Delta \tau \cdot \frac{f_{m1}}{f_{m2} - f_{m1}}$$

in order to determine the absolute delay of the quadrupole X, which is designated as $t_a$.

Preferably the values for the second and third signal frequencies $f_{m1}$ and $f_{m2}$ are so selected that the factor $$\frac{f_{m1}}{f_{m2} - f_{m1}}$$

yields a simple numerical value. If, for example, $f_{m2}$ is chosen 10% greater than $f_{m1}$, then there results for said factor the numerical value 10, in which case it is possible to simultaneously read off on the scale of voltmeter 8 the value of the absolute delay.

FIG. 2 illustrates an example of the invention utilizing a system for the measurement of the group delay which contains a cathode ray tube 10 in place of a voltmeter. The curve of the group delay characteristic appearing on the picture screen represents the measuring frequency for a certain frequency range. In such a measuring arrangement, the first signal generator 9 is designed as a sweep or wobble generator, which generates a wobbled signal frequency $f'$, i.e., continuous frequency modulated in a periodic manner. The horizontal deflection device 11 is fed from a discriminator 13, which is connected either before or after the quadrupole X, and produces a direct current which is proportional to the instantaneous amplitude value of the wobbled signal frequency $f'$, while the vertical deflection device 12 of the cathode ray tube 10 is connected with the output of the phase measurement device 7, which like the other circuit components 1, 3, 4, 5, 6 corresponds to the similarly designated components in FIG. 1.

The two deflection devices 11 and 12 cooperate to produce on the picture tube of the cathode tube 10, a curve which corresponds to the course of the group delay, dependent on the particular frequency. Thus, when the second signal generator 1 is set for the second signal frequency $f_{m1}$, there will result a first curve $\tau_1'$ while for a setting of the signal generator 1 for the third signal frequency $f_{m2}$, the curve $\tau_2'$ will be produced. As is apparent from FIG. 2, the two curves are vertically displaced with respect to each other, the vertical displacement being designated $\Delta \tau'$. If in such case the picture screen of the cathode tube 10 is calibrated vertically in values of the group delay which result for the second signal frequency $f_{m1}$, or for the third signal frequency $f_{m2}$, the distance $\Delta \tau'$ can then be read off as a numerical figure. This numerical value is evaluated according to the teaching of the invention in the same manner as the numerical value $\Delta \tau$ previously mentioned.

Changes may be made within the scope and spirit of the appended claims which define what is believed to be new and desired to have protected by Letters Patent.

I claim:

1. A circuit arrangement for the measurement of the absolutely delay of a quadrupole, comprising a first adjustable signal generator which generates a first, fixed signal frequency, a second signal generator which alternately generates a considerably lower second signal frequency from said first frequency and a third signal frequency which deviates slightly from said second signal frequency, a modulator having inputs, to which said signal generators are respectively connected, and an output, a demodulator, the quadrupole to be measured having its input connected with the output of the modulator and its output connected with the input of said demodulator, a phase measurement device having inputs which are connected respectively to the output of said demodulator and to said second signal generator, which device generates an output voltage whose amplitude is proportional to the phase difference of the voltage at the two inputs, and visual indicating means which indicates the amplitude of said output voltages, which indicating means is calibrated in values of the group delay for at least one of the second signal frequency and the third signal frequency and from which can be read off, the difference $\Delta \tau = \tau_1 - \tau_2$ of the indicated value $\tau_1$ for the second signal frequency, and of the indicated value $\tau_2$ for the third signal frequency, whereby the expression $$\Delta \tau \cdot \frac{f_{m1}}{f_{ma} - f_{m1}}$$

is proportional to the absolute delay, wherein $f_{m1}$ represents the second frequency, and $f_{m2}$ the third frequency.

2. A circuit arrangement as defined in claim 1, wherein said indicating means is a voltmeter.

3. A circuit arrangement as defined in claim 1, wherein said first signal generator is constructed as a sweep generator and generates a wobbled first signal frequency, said indicating means comprising a cathode ray tube, a discriminator operatively connected to said first signal generator for generating a voltage proportional to the first, wobbled signal frequency, which voltage is applied to the horizontal deflection system of said tube, the vertical deflection system being connected to the output of said phase measurement device, the picture screen of said tube being calibrated in vertical direction in values of the group delay for at least one of the second signal frequency and the third signal frequency, and on which there can be read off the mutual vertical displacement $\Delta \tau'$ of the two group delay characteristics, $\tau'_1$ representing the second signal frequency and $\tau_2'$ the third signal frequency, whereby the expression $$\Delta \tau' \cdot \frac{f_{m1}}{f_{m2} - f_{m1}}$$

being proportional to the absolute delay, wherein $f_{m1}$ represents the second signal frequency, and $f_{m2}$ the third signal frequency.

References Cited

UNITED STATES PATENTS

| | | | |
|---|---|---|---|
| 2,588,376 | 3/1952 | Fox | 324—57 |
| 2,889,516 | 6/1959 | Staschover | 324—79 XR |
| 2,970,258 | 1/1961 | Sinclair | 324—57 |

FOREIGN PATENTS 1,047,936  12/1958  Germany.

RUDOLPH V. ROLINEC, *Primary Examiner.*

P. F. WILLE, *Assistant Examiner.*